United States Patent [19]

Dearlove et al.

[11] 4,423,094
[45] Dec. 27, 1983

[54] DURABLE CAST EPOXY TOOLING COMPOSITION

[75] Inventors: Thomas J. Dearlove, Troy; Richard K. Gray, Warren; Richard P. Atkins, Rochester, all of Mich.

[73] Assignee: General Motors Corporation, Detroit, Mich.

[21] Appl. No.: 440,976

[22] Filed: Nov. 12, 1982

[51] Int. Cl.³ ............................................. B05D 3/02
[52] U.S. Cl. ................................. 427/386; 427/388.2; 528/94
[58] Field of Search .................. 528/93, 94, 107, 104; 427/386, 379, 388.2

[56] References Cited

U.S. PATENT DOCUMENTS

| | | | |
|---|---|---|---|
| 3,575,926 | 4/1971 | Joyce et al. | 528/94 X |
| 4,180,166 | 12/1979 | Batdorf | 427/386 X |
| 4,186,036 | 1/1980 | Elms et al. | 427/386 X |
| 4,216,304 | 8/1980 | Gutekunst et al. | 528/94 |
| 4,237,149 | 12/1980 | Denk et al. | 427/386 X |
| 4,269,879 | 5/1981 | Davis | 427/386 X |

FOREIGN PATENT DOCUMENTS 1373779  11/1974  United Kingdom .

Primary Examiner—Thurman K. Page
Attorney, Agent, or Firm—Elizabeth F. Harasek

[57] ABSTRACT

A method and composition have been developed for providing wear resistant surfaces on tools used to stamp sheet metal. The composition is based on liquid epoxy novolac resin having a functionality greater than two filled with an inorganic powder having very high hardness. The epoxy constituent is cross linked and cured in two stages: it is first cured at room temperature with an aliphatic amine curing agent until it is hardened and is then toughened by an elevated temperature cure initiated by an imidazole curing agent. The composition may be used to cast an entire tool or as a surface coating layer for a less durable base.

2 Claims, No Drawings

DURABLE CAST EPOXY TOOLING COMPOSITION

BACKGROUND

Dies for stamping sheet metal parts are conventionally made of tool steel. Steel is the preferred die material because of its strength and durability, especially for stamping steel sheet. However, such dies are relatively costly due to the extensive machining needed to make them.

Therefore, substantial efforts have been directed toward finding a substitute for steel dies for stamping sheet metal parts. It is well known that epoxy based resins have many of the properties necessary for a good tooling material. For example, they are liquid before cure and can be cast into a mold of a desired shape. The cast dies do not require machining. We were seeking an epoxy tooling composition that could be used to make molds to produce stamped steel body panels for automotive prototype vehicles. We ultimately sought to discover epoxy compositions with properties good enough for use in making production tooling.

One commercial epoxy tooling composition is based on a liquid epoxy resin containing about 85 weight percent ceramic filler. This material is used in the aerospace industry for stamping aluminum aircraft parts. It is knows as Magno Ceram ® and is made by Magnolia Plastics Co. However, when this material was used to stamp conventional automotive body sheet steel which is much more difficult to deform then aluminum, the edges of the tools were severely chipped. Magno Ceram is not readily repairable, so it proved to be unsuited to our needs.

A method of making epoxy tools with relatively high compressive strength involves laying fiberglass mats into a mold having a mold cavity in the shape of the tool. After several layers of mat are built up, they are impregnated with liquid epoxy resin. However, such tools also tend to chip and are not repairable. The structural integrity of such a tool is destroyed once the fiberglass mat is exposed.

Another commercial product that we examined was Ren TDT-177 sold by the Ren Plastics Division of Ciba-Geigy. It is based on a diglycidyl ether of bisphenol-A that is filled with molybdenum sulphide and silicon dioxide powders. A disadvantage of this material was its relatively low compressive strength before failure (about 138 megapascals). Tools we made from Ren TDT-177 also tended to break at the edges. The tooling material also seemed to have a low tolerance to bending and sliding of sheet steel along the working surface of the tool.

As none of the known compositions proved to be rugged enough to stamp automotive body sheet steel, even on a limited production of a few parts, it was our object to develop a novel and improved epoxy-based tooling composition.

BRIEF SUMMARY

Accordingly, we have invented a tooling composition that can be used to cast durable, abrasion resistant tools suitable for stamping steel parts. The composition is based on epoxy novolac resin having an average epoxide functionality greater than two. A lesser amount of a low viscosity, aliphatic, triglycidyl ether epoxy resin modifier is added to the novolac resin to improve the handleability of the uncured system and increase the capacity of the resin to accept filler.

A filler is incorporated to provide compression strength and durability. A preferred filler for the subject epoxy compositions is silicon carbide powder. Fine mesh silicon carbide particles allow for exceptional die surface characteristics such as increased hardness and abrasion resistance.

A key feature of the subject tooling composition is a unique combination of curing agents. A first aliphatic amine agent such as diethylene-triamine (DETA) is incorporated to affect an initial partial cure of the epoxy resins at room temperature. The amine causes the epoxy resin to solidify without unpredictable changes in shape. A second imidazole curing agent activated at elevated temperatures above the peak exotherm reached by the first amine agent, is incorporated to complete the cure of the epoxy resins and promote additional cross linking of the epoxies. The second cure step increases the hardness of the tool as cast without inducing warpage or other unacceptable effects. We have found where relatively thick sections of tools are to be made, it is preferred to incorporate a third type of curing agent which is active at room temperature but which does not generate exotherms as high as those of aliphatic amines. The incorporation of small amounts of aromatic amines such as methylenephenyldiamine, prevents runaway initial cure of the epoxy with incumbent heat build up and distortion of the tool shape. It also helps prevent premature activation of the imidazole.

We have created a castable, room temperature hardenable epoxy tooling composition. Our composition allows a tool to be cast directly in the desired shape and to retain this shape during room temperature and elevated temperature cure steps. We have found that the finally cured tool material is extremely crush resistant; so much so that it is adaptable to stamping steel. Moreover, the composition is very abrasion and chip resistant. Even if a tool does chip, it can be easily repaired with an easily handled patching compound. The composition is also an excellent material for surfacing tools made of less durable materials.

DETAILED DESCRIPTION

Compounding for the following Examples was carried out in a water jacketed double planetary Ross mixer. Uncured, liquid epoxy resin constituents were heated to about 100° C. before addition to the mixer. The epoxy resin was degassed in the mixer at a reduced pressure of about 30 inches mercury and stirred. The particulate filler was then added, and stirring and degassing were continued. Cool water was then run through the jacket of the mixer in order to stabilize the temperature within the mixer at less than about 40° C. to prevent premature reaction of the curing agents. Mixing and cooling times were adjusted in accordance with the quantities and properties of the materials.

The curing agent system was prepared separately from the epoxy resins. The curing agents were blended at room temperature in the desired amounts.

The catalyst mixture was then combined with the epoxy resin, the mixer was again closed and maintained under a vacuum, and the temperature within the mixer was maintained at 40° to 52° C. The mixing cycle was held to less than 30 minutes to make sure that the resin system was still readily pourable and would not set up prematurely in the mold. The catalyzed system was then poured into the mold, taking care not to entrap any air.

Unless otherwise indicated in the following Examples, all samples were poured into a desired mold; allowed to set overnight at room temperature to effect initial cure and hardening; demolded; and finally cured at an elevated temperature (generally 150°) so that the interior temperature of the sample was maintained at 100° C. for two hours. Standard compression testing cylinders were cast in silicone rubber molds and measured 12.7 mm in diameter by 25.2 mm in length. These test cylinders were evaluated in accordance with ASTM D-695-77.

EXAMPLE 1

A sample designated PTM100 was compounded based on DER 330 resin. DER 330 is a diglycidyl ether of bisphenol-A (DGEBA), (2,2-bis[4-(2'3'-epoxypropoxy)phenyl]propane) marketed by Dow Chemical. Substantially equivalent commercial products are Celanese Epi-Rez 508, Shell Epon 826 and Ciba-Geigy Araldite 6005. According to the marketing literature, DGEBA resin has an approximate epoxy equivalent weight of about 180 to 190 and a viscosity at 25° C. in the range of about 7000 to 10,000 centapoise.

Its structure can be generally illustrated

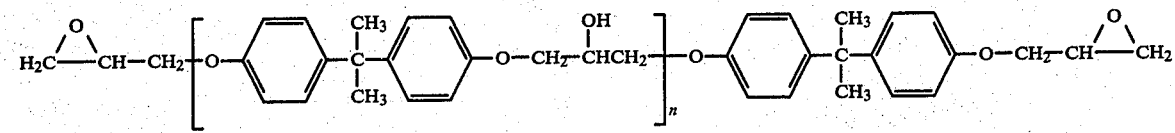

where n is approximately equal to 0.15. To each 100 weight parts DER 330, 150 weight parts 320 mesh silicon carbide was added. Six weight parts diethylene triamine and four weight parts 2-ethyl-4-methyl imidazole were premixed and then added to the epoxy resins. The catalyzed resin was poured into silicon rubber molds and allowed to stand overnight at room temperature. The composition had solidified and was easily handleable after the overnight cure at room temperature. The solidified samples were then demolded and heated for two hours each at 60°, 100° and 150° C. After final cure in the oven, the composition exhibited a measured compressive strength of 173 megapascals (ASTMD-G95-77).

EXAMPLE 2

A sample designated PTM 130 was compounded based on 100 weight parts Epi-Rez SU 2.5 and 25 weight parts Epi-Rez 5048. Epi-Rez SU 2.5 is a novolac epoxy resin marketed by Celanese Plastics and Specialties Company. According to its marketing literature, it has an epoxy equivalent weight of approximately 190 and a viscosity of about 2,700 centapoise at 52° C. Its general structure may be illustrated as

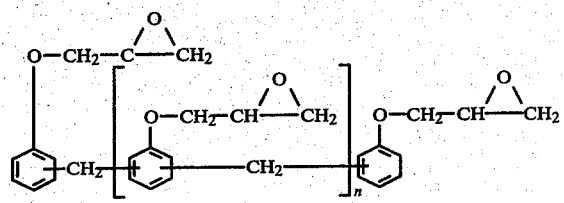

where n is approximately equal to 0.5. Epi-Rez 5048 is a low viscosity, aliphatic, triglycidyl ether resin marketed by Celanese Plastics and Specialties Company. It has an epoxide equivalent weight of approximately 150 and a viscosity at 25° C. of about 150 centapoise. It is effective in lowering the viscosity of the SU 2.5 to the extent that it is readily adaptable to receiving larger amounts of filler without losing castability at room temperature. Any such diluent constituent must contain reactive epoxy groups and preferably have a functionality of at least two so that it reacts into the hardened novolac resin. We believe that a nonreactive diluent would adversely affect die durability.

188 parts 320 mesh silicon carbide and 5 parts 320 mesh molybdenum disolphide powders were added to the epoxy resin. We initially believed that the molybdenum disulphide would help the lubricity of the dies, but it was later found that it had no real effect on lubricity or abrasion resistance and was not incorporated in later formulations. 7.5 parts diethylene triamine and 5 parts 2-ethyl-4-methylimidazole were premixed and then added to the epoxy resins as in Example 1. The PTM 130 composition was poured into silicone molds for compression samples which were allowed to stand overnight at room temperature. The peak exotherm of the amine activated room temperature cure did not exceed the activation temperature of the imidazole. The samples were demolded and post-cured for 2 hours at 150° C. to activate the imidazole curing agent and finally cross link and cure the samples. PTM 130 had a measured compressive strength of 168 megaPascals (ASTM D-695-77).

EXAMPLE 3

A composition designated PTM 140 was made as in Example 2 with 100 parts Epi-Rez SU 2.5 and 25 parts Epi-Rez 5048. To the epoxies, 188 parts 320 mesh silicon carbide powder were added. The curing agent system was changed to reduce the exotherm of the room temperature portion of the cure cycle so that larger castings could be made without causing a peak exotherm higher than the activation temperature of the imidazole curing agent. The low temperature curing agent system consisted of 10 parts Varsamid® 140 which is a polyfunctional aliphatic amine, marketed by General Mills. It is substantially equivalent to Celanese Epi-Cure 8540 and Shell V-40 and has a viscosity range of about 200 to 600 centapoise at 40° C. and the general structure

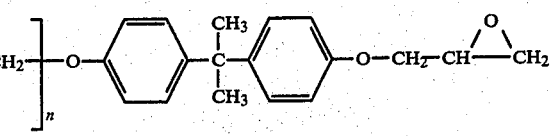

n = 5–15 where n equals about 5 to 15. 6.25 parts curing agent Z® were added to the Versamid 140 to moderate the room temperature cure exotherm. Curing Agent Z consists of a blend of methylene dianiline and m-phenylenediamine combined to form a liquid aromatic amine eutectic. The aromatic amines slow down the room temperature cure. Curing Agent Z is marketed by Shell Chemical Co. and according to the marketing literature has a viscosity range of about 1,000 to 2,000 centapoise at 25° C. and an approximate equivalent weight of about 43. The high temperature curing agent consisted of five parts 2-ethyl-4-methylimidazole. Compression testing samples were cast and cured as in Example 2. The samples had a compressive strength so exceptionally high that they could not be crushed in the test device.

EXAMPLE 4

One of the principal advantages of the subject tooling compositions is their repairability. Accordingly, a repair composition was developed. A preferred formulation is 100 parts DER 330 combined with 275 weight parts 320 mesh silicon carbide and 8 parts 2-ethyl-4-methylimidazole (EMI) curing agent. This material has a measured compressive strength of approximately 169 megaPascals. It can be mixed by skiving the epoxy, filler and EMI together on a flat surface. The surface of the tool is heated to about 75° to 85° C. and the patching compound is locally applied with a spatula. It cures fully within about 4 hours at room temperature. The hardened patch material can be fine-sanded to provide the desired die surface contour. It had a measured compressive strength of about 169 MegaPascals.

EXAMPLE 5

100 weight parts Epi-Rez SU 2.5 were combined with 25 weight parts Epi-Rez 5048, 188 parts silicon carbide and 5 weight parts molybdenum disulphide. This base resin was used to evaluate the following combinations of curing agents. Aliquots of 750 grams each of the resin mixture were combined with the following curing agent systems in the indicated amounts:
1. 18 grams diethylene triamine and 12 grams ethylmethylimidazole.
2. 30 grams Curing Agent Z and 12 grams ethylmethylimidazole.
3. 15 grams Curing Agent Z, 12 grams ethylmethylimidazole and 24 grams Versamid ® 140.
4. 16 grams Versamid ® 140 and 12 grams ethylmethylimidazole.
5. 30 grams n-aminoethylpiperazine and 12 grams ethylmethylimidazole.

The aliquots were allowed to stand at room temperature in 1,000 mil polypropylene beakers. Curing agent systems 1 and 5 gave what were considered excessive exotherms that would lead to tool damage during cure, while system 4 did not cure sufficiently for demolding within 48 hours. Systems 2 and 3 cured to a Shore D hardness of 65 to 67 on the outer surface after 40 hours at room temperature. Both samples 2 and 3 were demolded and subsequently post-cured for 2 hours at 150° C. After the post-cure, the surface of system 2 had a Shore D hardness of 90 while that of system 3 gave a value of 92. The interior of the samples were exposed by cutting with a diamond blade and the resulting surfaces had measured Shore D hardnesses of 97 for both samples. We believe that system 2 would be most suitable where the epoxy tooling composition would be provided as a liner or thin section on the surface of the tool while the Versamid 140-containing composition, exhibiting reduced exotherm on initial cure, would be more suitable for tools with thicker epoxy cross sectional areas.

EXAMPLE 6

To evaluate the materials described in Examples 1 through 4 above, a punch was made for a flange forming operation used in the manufacture of fuel filler doors for General Motors X-Body passenger car lines. The punch was a duplicate of the steel punch used in production and was mounted on a double action press with a die cushion [see, e.g., Metals Handbook, Vol, 4, 8th Edition, Page 10, FIG. 9(b)]. All tooling except the punch (dies, slide, bolster, etc.) was made of tool steel. The working surface of the punch was 168 mm by 160 mm and had a mild compound curvature matching that of the rear quarter panel in which it is incorporated. The punch was about 67 mm thick along its edges. Threaded bolt anchors were set into the corners of the punch for mounting it to the press slide when the epoxy was cast. The tool was mounted on Pacific Model 100 PF hydraulic double action press. The filler doors were blanked from 21 gauge cold rolled sheet steel. The blanks were simply taken from a supply of those to be formed with conventional tool steel punches at a production facility. The punch was cast in a female mold made of epoxy and plaster with a polyvinyl acetate mold release. The formulation used to cast the punch was PTM 140 described in Example 3. It was poured into the mold after mixing, allowed to harden overnight and then baked at 150° C. for several hours to finally cure and cross link the epoxies. The punch maintained the dimensions of the mold.

The tool was used to flange twenty-seven filler doors from 21 gauge sheet steel. No wear or fracture of the punch material was visible after the run. In order to test the patch material, the edges of the tool were then intentionally notches and the notches were filled in with repair material as set out in Example 5. Twenty-seven more filler doors were flanged with the patched tool and again, there was no damage or visible wear. We have stamped as many as 100 filler doors from a filler door punch made of PTM 140 with no damage or visible wear of the tool.

In contrast, we made like punches of Magno Ceram sold by Magnolia Plastics and REN TDT-177 sold by Giba-Geigy in accordance with their recommended procedures and none of the punches survived stamping even a few steel blanks without severe damage to the edges. Similarly, PTM100 based on DGEBA did not form a durable punch.

The abrasion resistance of the PTM 100, 130 and 140 compositions as well as Magno Ceram and the REN TDT-177 was tested in accordance with the procedure set out at page 179 of *Mechanics of Sheet Metal Forming—Material Behavior and Deformation Analysis*, published by Plenum Press, 1978, edited by Donald P. Koistenen and Neng-Ming Wang. In the test procedure, a steel strip is drawn across a weighed bead of the tool material with a predetermined amount of pressure. The mass lost by the bead is a measure of the abrasion resistance of the material and of tools formed from it. Table 1 shows the weight changes for sample beads having a hemispherical cross section with an initial diameter of 9.5 mm and a length of 70 mm after ten repetitions of the procedure.

TABLE 1

| Sample ID | Weight Change After 5 cycles (mg) | Weight Change After 10 cycles (mg) |
|---|---|---|
| PTM 100 | −2.2 | −4.2 |

TABLE 1-continued

| Sample ID | Weight Change After 5 cycles (mg) | Weight Change After 10 cycles (mg) |
|---|---|---|
| PTM 130 | −2.3 | −3.8 |
| PTM 140 | −1.2 | −1.9 |
| TDT-177 | +.9* | −4.8 |
| Magno-Cream | All samples broke on first trial | |

*metal from steel sample deposited on tool due to its abrasive surface.

PTM 140 exhibited very good abrasion resistance, while that of PTM 100 and PTM 130 was comparable or better than REN TDT-177. The Magno-Ceram samples all broke before abrasion resistance values could be gathered.

As seen from the several preceding Examples, we have discovered a novel composition for epoxy tooling which is rugged and strong enough to be used in stamping steel for automotive vehicle bodies. Given that the filled polymeric tooling material performs so well in such a rigorous environment, it would clearly be an excellent choice for tools for forming softer metals or molding filled or unfilled thermoplastic or thermoset polymers.

The preferred practice of the invention entails the compounding of liquid epoxy novolac resin having a functionality greater than two with a suitable amount of a lower viscosity liquid diluent having reactive functional epoxy groups. Reinforcement and excellent abrasion resistance are provided by adding a powdered filler of a very hard material such as silicon carbide. Other particulate fillers of like hardness would be equally suited to the practice of the invention. The mesh of the particulate filler and the maximum possible loadings are clearly determinable within the skill of the art. With the mixing equipment we had available, a loading level of 150 weight parts 320 mesh silicon carbide per 100 parts resin was about maximum. We could have achieved higher loadings without excessive increases in viscosity and loss of pourability of the catalyzed resins, but could not effect good mixing. To the mixture of epoxy resins and filler are added two types of curing agents: an amine for room temperature cure and an imidazole for elevated temperature cure, the imidazole being activated only at a temperature above the peak exotherm generated by the room temperature cure reaction.

Our compositions can be poured as mixed into a mold in the shape of a desired tool. The cast epoxy tool is then allowed to cure at room temperature until it hardens and is fairly tough and easy to handle. Thus, the mold in which a tool is cast need not be able to withstand the elevated temperatures of the secondary cure. The hardened tool is then post-cured at a temperature at which the imidazole is activated to further harden and cross link the epoxy resin. The cast tools require no machining if the molds conform to the end tool shapes and are therefore economical to produce.

A preferred use of the subject compositions is to coat the surface of an epoxy based tooling that would not, by itself, withstand the rigors of stamping steel sheet for making prototype automotive vehicles. Female molds for hydraulic stamping tools have been coated with a layer of a composition in accordance with PTM 140 to thicknesses up to about 20 mm. This layer is allowed to harden at room temperature. The mold is then filled with an epoxy based on bisphenol-A containing iron powder as a filler. The second epoxy constituent is then allowed to harden at room temperature. The tool is then baked at elevated temperature to finally cure and harden the face coat of PTM 140. Tools weighing over 500 kilograms have been made in this manner. They exhibit exceptional strength and wear resistance and can be cast to size with minimal or no shrink.

While my invention has been described in terms of specific embodiments thereof, other forms may be readily adapted by one skilled in the art. Accordingly, the scope of the invention is to be limited only by the following claims.

The embodiments of the invention in which an exclusive property or privilege is claimed are defined as follows:

1. A method of providing a wear resistant surface on a tool for deforming sheet metal comprising coating at least the working surface of a said tool with a mixture comprising a liquid epoxy novolac resin having an epoxide functionality greater than two, a liquid aliphatic epoxy resin having a lower viscosity than said epoxy novolac resin, a particulate filler having a microhardness substantially equal to or greater than the microhardness of silicon carbide, an aliphatic amine curing agent for said epoxy resins that is active at room temperature, and an imidazole curing agent for said epoxy resins that is first active at a temperature above the peak exotherm generated in the mixture by the activity of the aliphatic amine curing agent; allowing said coated mixture to stand at room temperature until it hardens; and thereafter heating said hardened coated mixture to an elevated temperature whereat the imidazole curing agent is active to further cross link the epoxy constituents and increase the toughness of the mixture.

2. A tough, abrasion resistant, repairable composition for use on the working surfaces of forming tools for metal sheet comprising a liquid epoxy novolac resin having an epoxy functionality greater than two; an aliphatic polyfunctional liquid epoxy resin having a lower viscosity than said liquid epoxy novolac resin; a fine mesh particulate filler having a hardness substantially equal to or greater to the hardness of silicon carbide; an aliphatic polyfunctional amine curing agent for said epoxy resins that is active at a temperature of about 20° C.; and an imidazole curing agent for said epoxies that is first active at a temperature above the peak exotherm temperature generated by the activity of the amine curing agent, said composition being a pourable liquid as it is mixed but which hardens at room temperature and which is thereafter toughened by heating to an elevated temperature whereat imidazole curing agent is activated.

* * * * *